United States Patent
Eversman et al.

(10) Patent No.: US 11,194,843 B2
(45) Date of Patent: Dec. 7, 2021

(54) METHODS AND SYSTEMS FOR VISUAL MANAGEMENT OF RELATIONAL DATA

(71) Applicant: INTERNATIONAL BUSINESS MACHINES CORPORATION, Armonk, NY (US)

(72) Inventors: John Dillon Eversman, Austin, TX (US); Voranouth Supadulya, Austin, TX (US); Thanh Lam Hoang, Maynooth (IE); Jing James Xu, Xi'an (CN); Lin Ju, Markham (CA); Jun Wang, Yan Ta Zone (CN); Jishuo Yang, On (CA); Craig Tomlyn, San Jose, CA (US); Ji Hui Yang, BeiJing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 16/664,344

(22) Filed: Oct. 25, 2019

(65) Prior Publication Data

US 2021/0124768 A1    Apr. 29, 2021

(51) Int. Cl.
*G06F 16/28* (2019.01)
*G06F 16/22* (2019.01)
(Continued)

(52) U.S. Cl.
CPC ............ *G06F 16/287* (2019.01); *G06F 9/451* (2018.02); *G06F 16/221* (2019.01);
(Continued)

(58) Field of Classification Search
CPC .............. G06F 16/287; G06F 16/2423; G06F 16/24542; G06F 16/2282; G06F 16/2456; G06F 9/451; G06F 16/221; G06N 20/00
See application file for complete search history.

(56) References Cited

U.S. PATENT DOCUMENTS

| 5,553,218 A | 9/1996 | Li et al. |
| 5,615,367 A | 3/1997 | Bennett et al. |

(Continued)

FOREIGN PATENT DOCUMENTS

| EP | 1367503 A1 | 1/2003 |
| JP | 2004164363 A | 11/2001 |
| WO | 2013024927 A1 | 2/2013 |

*Primary Examiner* — Cam Y T Truong
(74) *Attorney, Agent, or Firm* — Griffiths & Seaton PLLC

(57) ABSTRACT

Embodiments for managing feature engineering with relational data are provided. A graphical user interface (GUI) that provides a user with the ability to upload a plurality of tables, select joins between the plurality of tables, and select keys for the joins is provided. Responsive to receiving user input indicative of selecting joins between the plurality of tables and selecting keys for the joins utilizing the GUI, the user selections are automatically validated and actions associated with at least some of the plurality of tables are dynamically performed based on the user selections. Information associated with the user selections and the validating is provided. The information includes a recommendation to link a third key in the at least some of the plurality of tables to a fourth key in the at least some of the plurality of tables.

18 Claims, 17 Drawing Sheets

(51) Int. Cl.
*G06F 16/242* (2019.01)
*G06N 20/00* (2019.01)
*G06F 16/2455* (2019.01)
*G06F 9/451* (2018.01)
*G06F 16/2453* (2019.01)

(52) U.S. Cl.
CPC ...... *G06F 16/2282* (2019.01); *G06F 16/2423* (2019.01); *G06F 16/2428* (2019.01); *G06F 16/2456* (2019.01); *G06F 16/24542* (2019.01); *G06N 20/00* (2019.01)

(56) References Cited

U.S. PATENT DOCUMENTS

| | | | |
|---|---|---|---|
| 9,665,607 B2 | 5/2017 | Swarnakar | |
| 2003/0055830 A1* | 3/2003 | Gutierrez-Rivas | ............... G06F 16/2423 |
| 2006/0224574 A1* | 10/2006 | Dettinger | ............ G06F 16/2428 |
| 2012/0278306 A1* | 11/2012 | Cochrane | ................ G06F 16/26 707/714 |

* cited by examiner

METHODS AND SYSTEMS FOR VISUAL MANAGEMENT OF RELATIONAL DATA

BACKGROUND OF THE INVENTION

Field of the Invention

The present invention relates in general to computing systems, and more particularly, to various embodiments for visual management of relational data.

Description of the Related Art

Most current automated data science tools target or approach automated data science utilizing a single table as input. However, in reality, data scientists (or engineers) spend much of their time working on databases with multiple tables in relational formats.

As a result, a considerable amount of effort is spent on performing table join (or joining tables) and/or table aggregation. Additionally, even more complex transformations are required to transform relational data that includes multiple tables into a single table which can be used by machine learning systems to train machine learning models. This task, which may be referred to as feature engineering for relational data, is typically done manually and is generally considered to be one of the most time-consuming tasks in data science involving relational data.

SUMMARY OF THE INVENTION

Various embodiments for managing feature engineering with relational data, by a processor, are provided. A graphical user interface (GUI) that provides a user with the ability to upload a plurality of tables, select joins between the plurality of tables, and select keys for the joins is provided. Responsive to receiving user input indicative of selecting joins between the plurality of tables and selecting keys for the joins utilizing the GUI, the user selections are automatically validated, and actions associated with at least some of the plurality of tables are dynamically performed based on the user selections. The actions include forming a join between the at least some of the plurality of tables, linking a first key in the at least some of the plurality of tables with a second key in the at least some of the plurality of tables, and adjusting a presentation of the at least some of the plurality of tables. The adjusting of the presentation automatically changes a layout of at least some of the plurality of tables in the GUI. Information associated with the user selections and the validating is provided. The information includes a recommendation to link a third key in the at least some of the plurality of tables to a fourth key in the at least some of the plurality of tables.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
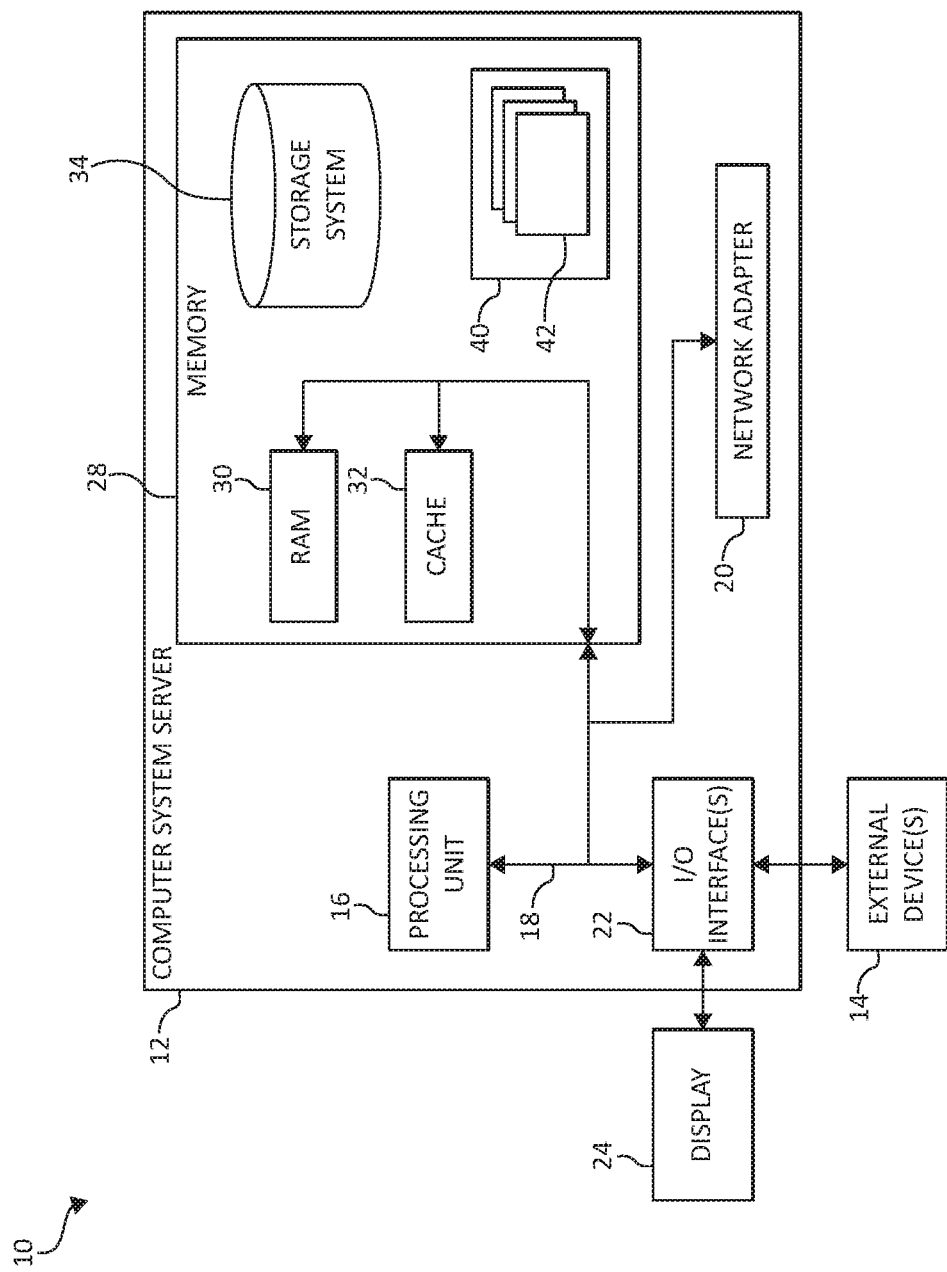
FIG. 1 is a block diagram depicting an exemplary computing node according to an embodiment of the present invention.

As discussed above, most current automated data science tools target or approach automated data science utilizing a single table as input. However, in reality, data scientists (or engineers) spend much of their time working on databases with multiple tables in relational formats.

As a result, a considerable amount of effort is spent on performing table join (or joining tables) and/or table aggregation. Additionally, even more complex transformations are required to transform relational data that includes multiple tables into a single table which can be used by machine learning systems to train machine learning models. This task, which may be referred to as feature engineering for relational data, is typically done manually and is generally considered to be one of the most time-consuming tasks in data science involving relational data.

In some current systems, a query is received that is related to data stored in a database that is implemented in computer memory. Based on the received query, attributes of data stored in the database that are relevant to generating a response to the received query are identified. Information that is indicative of attributes for which values are recorded in different tables included in the database is accessed. Based on having accessed this information, tables included in the database that record values for the attributes identified as being relevant to generating a response to the received query are identified. These tables then are joined to create, within computer memory, a new table that reflects relationships between values of attributes identified as being relevant to generating a response to the received query. However, it should be noted that such systems only work in response to received queries and do not provide a visualization of the process.

Other current systems may provide for visually constructing and displaying relational queries on a tabular interface. In such systems, a query is a relational expression that defines how to extract and process data from a data source, such as a relational database, or other sources where data may be extracted and converted to tables consisting of columns. The queries may be composed of other queries using relational operators, such as join and union, potentially resulting in a complex intertwined tree-like structure. Such systems provide methods of representing hierarchical query structure on a tabular interface using nested table structures, and steps for constructing and manipulating the structure using spatial relationships. They may provide the ability to work with highly complex hierarchical tree-link structures using a simple two-dimensional table and the ability to change the hierarchical structure using relative spatial placement of the tables. However, it should be noted that such systems utilize a table view to present deep layer joins, as opposed to visualizations to present hierarchical structures of joins.

To address these needs and/or the shortcomings in the prior art, in some embodiments described herein, methods and/or systems are disclosed that, for example, provide an interactive, visual exploration tool that facilitates exploration of databases with multiple tables to join (or aggregate) them together and generate common schema for use in machine learning training (and/or feature engineering).

In some embodiments, a user interface (or graphical user interface) is provided which may be utilized by a user(s) to select/upload multiple data tables (or similar files, such as spreadsheets, etc) and/or references to data tables. The users may, via the user interface, create (or select or form) one or more joins between the tables, and set/select keys included within/utilized by the joins, in a simply, intuitive manner. In some embodiments, the user is provided with recommendations or suggestions of keys, from which the user may select one or more keys to be utilized. After the user provides appropriate configuration input, the system may provide recommendations of changes to the configuration.

After the configuration is set (e.g., perhaps including changes recommended by the system), features for a machine learning model may be automatically generated. The user interface (or a second user interface) may then be provided, which allows the user to explore various types of information related to the generated features, including, for example, join paths, keys, and additional information related to transformations. This information, along with the simple, intuitive manner in which the information is provided, may enhance or facilitate the "explainability" of (e.g., the "logic" behind) the newly generated features, as will be appreciated by one skilled in the art.

More particularly, in some embodiments, the systems (and/or methods) described herein include (and/or utilize) a user interface (UI) or graphical user interface (GUI) for configuration of an automated feature engineering system for relational data, a "back-end" system for (or configured for) running (or performing) automated feature engineering for relational data, and a UI (or GUI) for visualization and/or exploration of output (or generated) features.

The UI for configuration of the automated feature engineering (or "autoconfiguration" UI or configuration UI) may include or provide various functionalities. For example, the configuration UI may provide the ability (i.e., to a user) to upload multiple data tables or references to tables to or from a database management system (DBMS) (or any suitable database, memory, etc.). The user may be allowed (or provided with the ability) to set (or select) a main or primary table, as well as declare (or select) a particular column in the table as a prediction target column. The configuration UI may provide an interactive visualization that allows the user to join tables (or create joins, links, associations, etc. between tables). For example, the user may be provided with the ability to "drag and drop" a link (e.g., via a user input device, such as a mouse and/or keyboard) between tables (e.g., to join the tables or create a join between the tables).

In some embodiments, the configuration UI may (e.g., after analyzing the appropriate tables) indicate the keys that may be utilized to link different (e.g., two or more) tables (e.g., indicate the number of available keys, specific details about the keys, etc.). The configuration UI may present or render the available keys in, for example, a table-like structure (or view) and allow the user to select one of more of the keys (e.g., via a suitable user input device).

The configuration UI may allow the user to move a table with any linked tables together to adjust the view of connections between the tables automatically. Also, the user may be provided with the ability to automatically adjust view port (or window) size (and/or the apparent sizes of the tables) so that all joined tables and the links therebetween at the same time. This may be achieved by, for example, calculating the size of the space needed to display the joined tables and calculating ratios (e.g., a horizontal (or x) ratio and a vertical (or y) ratio) needed to resize the space into the view port space. The configuration UI may also provide for automatically rearranging the layout of tables to visualize the join configuration. This may be achieved by applying a horizontal layout algorithm (e.g., available in an open source layout library) to calculate the new x/y positions of the joined tables.

The configuration UI may also provide the ability (e.g., via a settings or preferences functionality) select timestamps in the tables and/or cut-off timestamps in the tables (e.g., the main/primary table). Additionally, the ability to select features and sampling data configuration may be provided (e.g., via settings, preferences, etc.). In some embodiments, the various configurations, specification, etc. (e.g., creation of joins, selections of keys, etc.) performed by the user(s) utilizing the configuration UI is output as, for example, a JavaScript Object Notation (JSON) file (or other suitable file type).

The automated feature engineering system (or "autofeature engineering" system or feature engineering system, feature, or API) may include or provide various functionalities. The feature engineering system may perform a "sanity check" (or "sanity test") for the correctness of and/or inconsistencies in the input data (e.g., the output of the configuration UI), as in commonly understood in the art.

The feature engineering system may generate and provide recommendations with respect to the configuration (e.g., the user's input received by the configuration UI). For example, the feature engineering system may detect and/or provide detected timestamp information, recommendations to declare timestamps to improve results of the set of output features, that column types of the joined keys are inconsistent and the key type needs to be changed to make sure that the join will return the expected results, and that tables in the database are "unreachable" and recommend adding more connections in the database graphs to make those tables reachable from the main table.

The feature engineering system may automatically generate features (e.g., based on the input received by the configuration UI), as is commonly understood. Additionally, the feature engineering system may generate (or output) a feature dataframe with information for new features (e.g., joining paths from which features were extracted, transformation names, transformation description, etc.) and provide such to the UI for visualization of generated features.

The UI for visualization of generated features (or "auto-explorer" or model viewer or second UI/GUI) may receive the feature dataframe generated by the feature engineering system and automatically display, for example, a data summary including data quality, distribution, and univariate statistics for each feature. The model viewer may also receive information for new features outputted by the feature engineering system and automatically display a feature summary table including the names of the involved transformations, descriptions and importance of the transformations, joins, and/or keys, as well as the joining paths from which original features were extracted.

At least some of the aspects of functionality described herein may be performed utilizing a cognitive analysis (or machine learning technique). The cognitive analysis may include natural language processing (NLP) or a NLP technique, such classifying natural language, analyzing tone, and analyzing sentiment (e.g., scanning for keywords, key phrases, etc.) with respect to, for example, content (or data), communications sent to and/or received by users, and/or other available data sources. In some embodiments, natural language processing (NLP), Mel-frequency cepstral coefficients (MFCCs) (e.g., for audio content detected by a microphone), and/or region-based convolutional neural network (R-CNN) pixel mapping (e.g., for object detection/classification in images/videos), as are commonly understood, are used.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, managing relational data and/or feature engineering with relational data, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

In particular, in some embodiments, a method for managing feature engineering with relational data, by a processor, is provided. A graphical user interface (GUI) that provides a user with the ability to upload a plurality of tables, select joins between the plurality of tables, and select keys for the joins is provided. Responsive to receiving user input indicative of selecting joins between the plurality of tables and selecting keys for the joins utilizing the GUI, the user selections are automatically validated, and actions associated with at least some of the plurality of tables are dynamically performed based on the user selections. The actions include forming a join between the at least some of the plurality of tables, linking a first key in the at least some of the plurality of tables with a second key in the at least some of the plurality of tables, and adjusting a presentation of the at least some of the plurality of tables. The adjusting of the presentation automatically changes a layout of at least some of the plurality of tables in the GUI. Information associated with the user selections and the validating is provided. The information includes a recommendation to link a third key in the at least some of the plurality of tables to a fourth key in the at least some of the plurality of tables.

The validating of the user selections may include identifying problems associated with the user selections, identifying suggested changes to the user selections based on the identifying of the problems, and causing a notification of the suggested changes to be generated.

A feature for a machine learning model may be caused to be generated based on the forming of the join between the at least some of the plurality of tables and the linking of the first key in the at least some of the plurality of tables with the second key in the at least some of the plurality of tables. The information may include a transformation summary including information associated with a transformation of the generated feature.

Additional user input may be received utilizing the GUI. The additional user input may be indicative of a selection to link the third key in the at least some of the plurality of tables to the fourth key in the at least some of the plurality of tables. The generating of the feature for the machine learning model may be further based on the selection to link the third key in the at least some of the plurality of tables to the fourth key in the at least some of the plurality of tables.

The received user input may be further indicative of a selection of a column in one of the plurality of tables as a prediction target column. The received user input may include movement of a cursor between a first of the plurality of tables and a second of the plurality of tables within the GUI. A connection between the first of the plurality of tables and the second of the plurality of tables may be caused to be displayed within the GUI.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
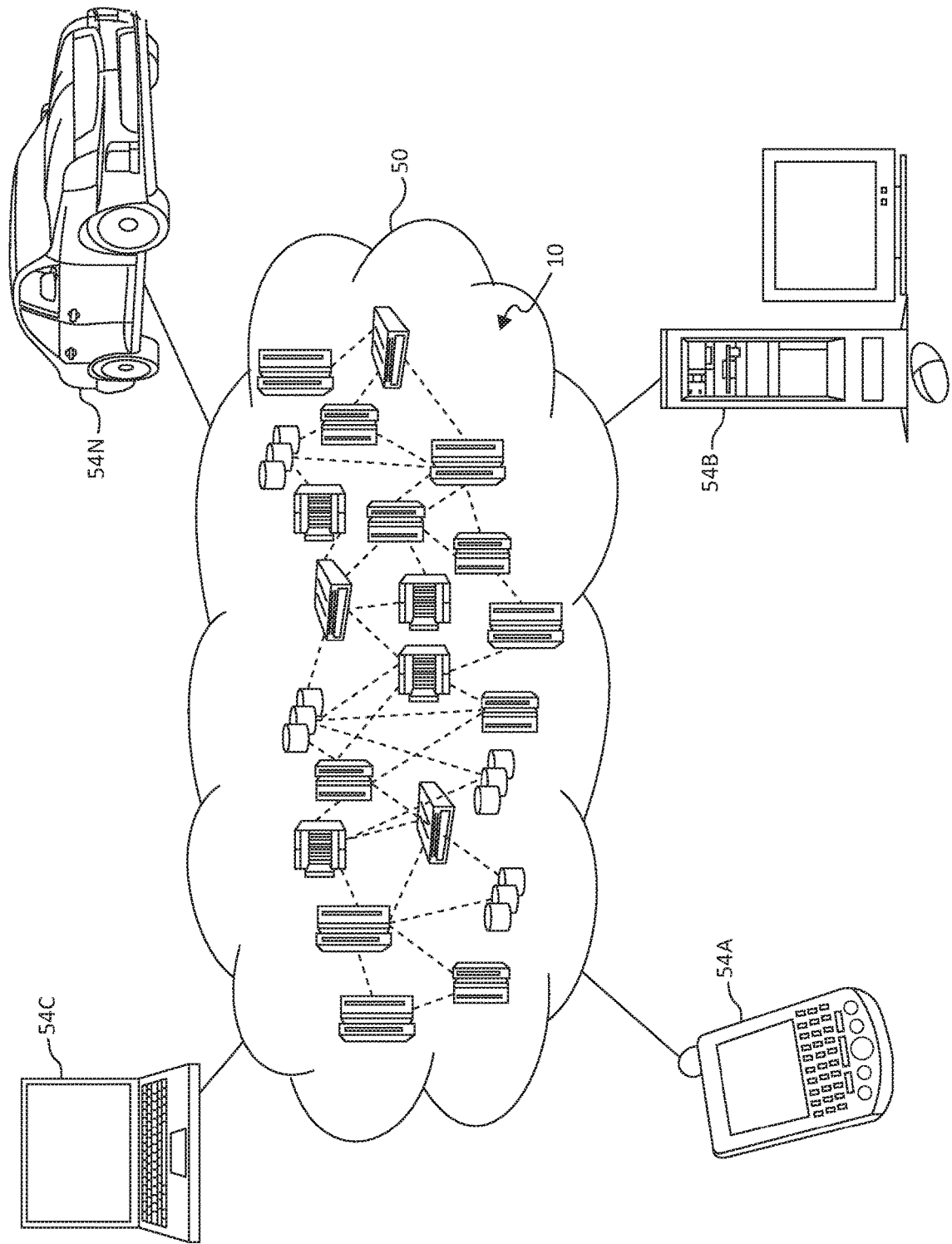
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
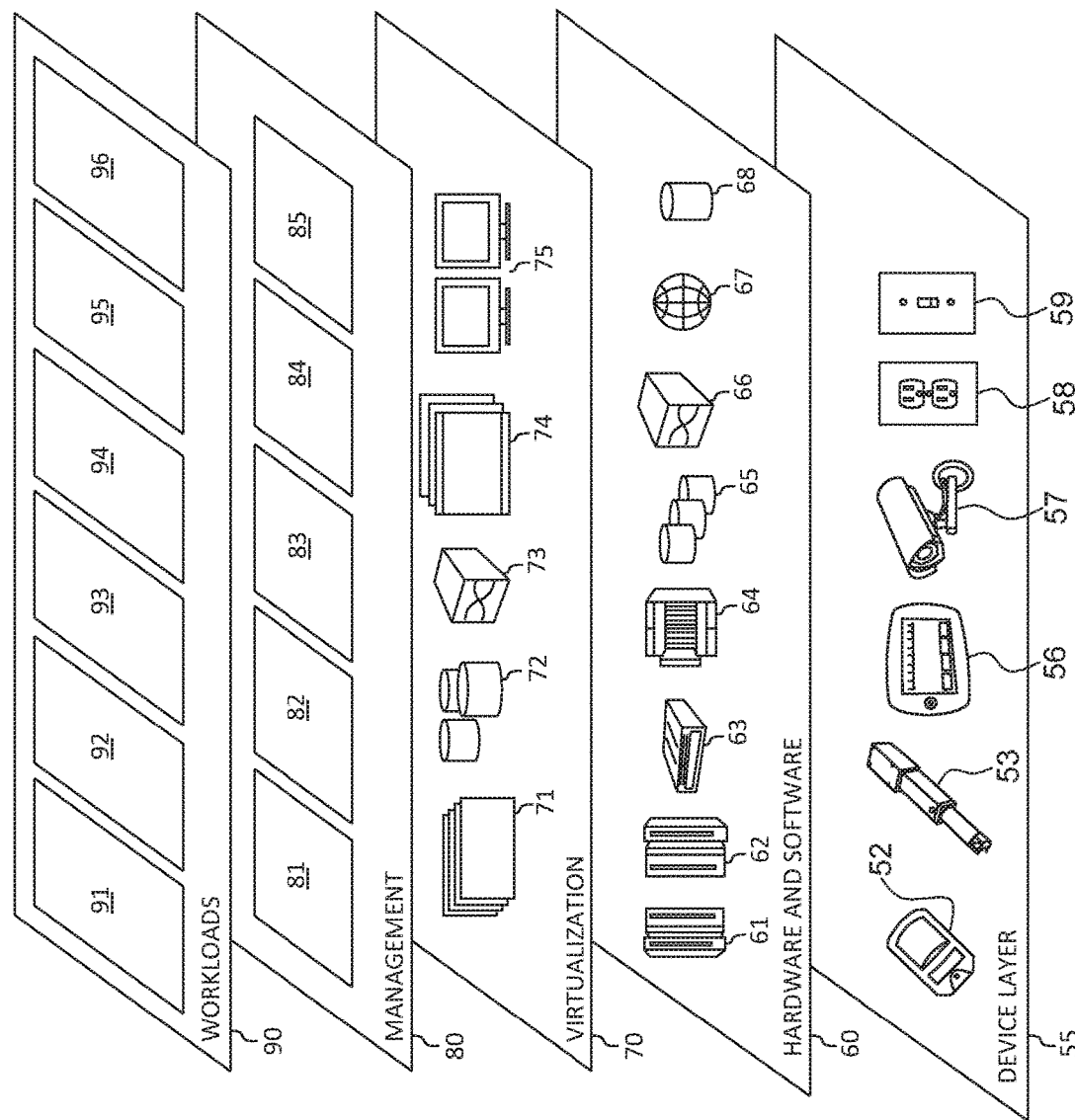
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing relational data and/or feature engineering with relational data, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided for managing relational data and/or feature engineering with relational data. In some embodiments, a user interface (or graphical user interface) is provided which may be utilized by a user(s) to select/upload multiple data tables (or similar files, such as spreadsheets, etc) and/or references to data tables. The users may, via the user interface, create one or more joins between the tables, along with keys included within/utilized by the joins, in a simply, intuitive manner. In some embodiments, the use is provided with recommendations or suggestions of keys, from which the user may select one or more keys to be utilized. After the user provides appropriate configuration input, the system may provide recommendations of changes to the configuration.

After the configuration is set (e.g., perhaps including changes recommended by the system), one or more features for a machine learning model may be automatically generated. The user interface (or a second user interface) may then be provided, which allows the user to explore various types of information related to the generated features, including, for example, join paths, keys, and additional information related to transformations. This information, along with the simple, intuitive manner in which the information is provided, may enhance or facilitate the "explainability" of the newly generated features, as will be appreciated by one skilled in the art.

Figure 4:
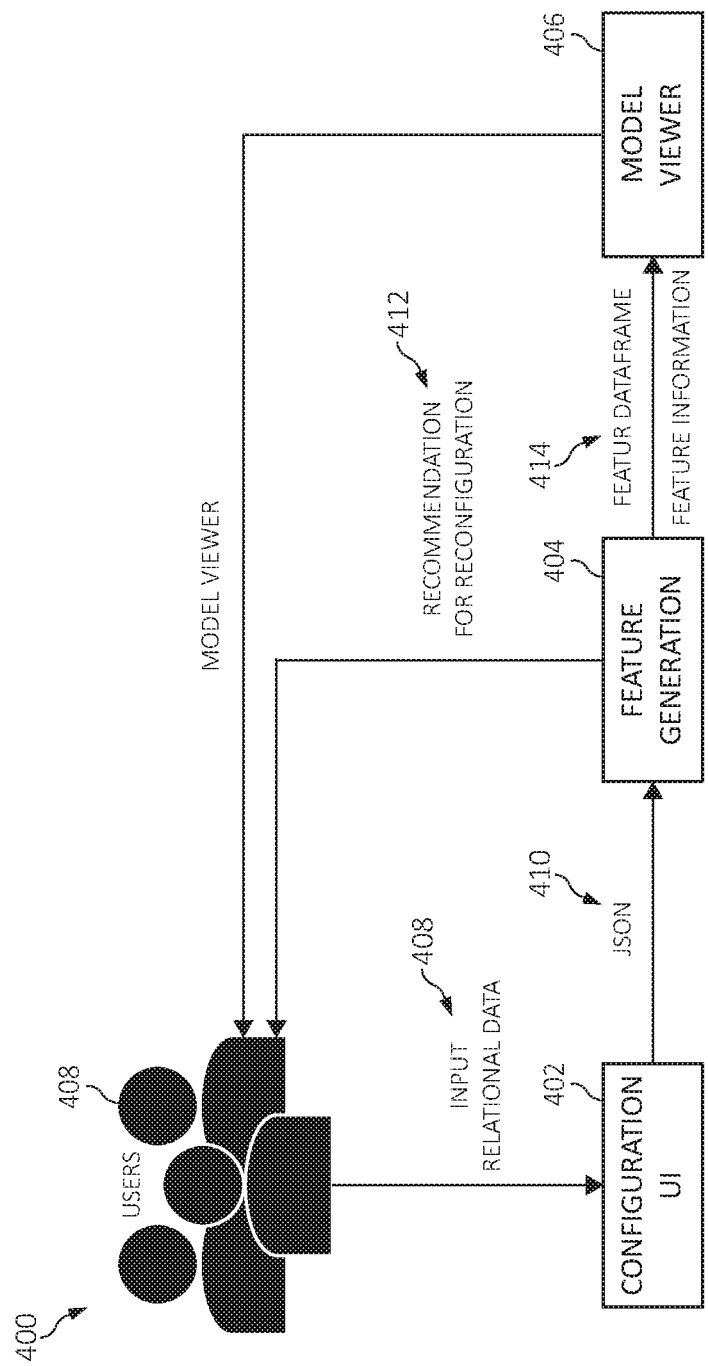
FIG. 4 is a block diagram of a system for managing relational data and/or feature generation with relational data according to an embodiment of the present invention.

FIG. 4 illustrates a system (and/or method) 400 for managing relational data and/or feature generation with relational data (and/or joining tables and/or exploring generated features) according to an embodiment of the present invention. In the depicted embodiment, the system 400 includes a configuration UI 402, a feature generation system 404, and a model viewer 406. Each of the components shown in FIG. 4 may be implemented utilizing any suitable computing device, such as those described above. In some embodiments, the configuration UI 402, the feature generation system 404, and the model viewer 406 may be implemented on a single computing system and/or on multiple computing systems located locally. However, in some embodiments, the components may be implemented on separate systems, which may be remotely located and in operable communication via any suitable communications network (e.g., via the Internet, the "cloud," etc.).

In some embodiments, one or more users 408 interact with the configuration UI 402 to, for example, provide (or input) relational data 408 (e.g., upload and/or select tables to be utilized, create joins between at least some of the tables, and select keys for the joins, as described above. More particularly, the configuration UI 402 may provide the ability (i.e., to a user(s) 408) to upload multiple data tables or references to tables to or from a DBMS) (or any suitable database, memory, etc.). Through the configuration UI 402, the user 408 may to set (or select) a main or primary table, as well as declare (or select) a particular column in the table as a prediction target column. The user 408 may also utilize the configuration UI 402 to join tables (or create joins, links, associations, etc. between tables), such as via a user input device (e.g., via mouse, using a "drag and drop" technique).

In some embodiments, the configuration UI 402 may (e.g., after analyzing the appropriate tables) indicate the keys (or suggest/recommend keys) that may be utilized to link different (e.g., two or more) tables (e.g., indicate the number of available keys, specific details about the keys, etc.). For example, a table (or table-like structure) or pull-down menu may be displayed, which includes the available keys. The user 408 may then select one of more of the keys (e.g., via a suitable user input device). The user 408 may also select timestamps in the tables and/or cut-off timestamps in the tables (e.g., the main/primary table) and select features and sampling data configuration (e.g., via settings, preferences, etc.) via the configuration UI 402.

The configuration UI 402 may also allow the user 408 to move a table with any linked tables together to adjust the view of connections between the tables automatically. Also, the user may be provided with the ability to automatically adjust view port (or window) size (and/or the apparent sizes of the tables) so that all joined tables and the links therebetween at the same time. This may be achieved by, for example, calculating the size of the space needed to display the joined tables and calculating ratios (e.g., a horizontal (or x) ratio and a vertical (or y) ratio) needed to resize the space into the view port space. The configuration UI may also provide for automatically rearranging the layout of tables to visualize the join configuration. This may be achieved by applying a horizontal layout algorithm (e.g., available in an open source layout library) to calculate the new x/y positions of the joined tables.

In some embodiments, the various configurations, specification, etc. (e.g., creation of joins, selections of keys, etc.) performed by the user(s) utilizing the configuration UI 402 is output as a JSON file 410.

The feature engineering system 404 receives (or retrieves) the JSON file 410 from the configuration UI 402. In some embodiments, the feature engineering system 404 performs a sanity test for the correctness of and/or inconsistencies in the JSON file 410. In the depicted embodiment, the feature engineering system 404 may generate (re)configuration recommendations 412 and provide such to the user 408 (e.g., via a notification/indication in the configuration UI 402). For example, the feature engineering system 404 may detect and/or provide detected timestamp information, recommendations to declare timestamps to improve results of the set of output features, that column types of the joined keys are inconsistent and the key type needs to be changed to make sure that the join will return the expected results, and that tables in the database are "unreachable" and recommend adding more connections in the database graphs to make those tables reachable from the main table. Such recommendations (i.e., if generated/appropriate) may be utilized by the user 408 to reconfigure the joins, keys, etc. via the configuration UI 402 before any new features are generated.

The feature engineering system 404 automatically generates features (e.g., based on the input received by the configuration UI and the information in the joined tables), as is commonly understood. The feature engineering system 414 also generates (or outputs) a feature dataframe and feature information 414 for new features (e.g., joining paths from which features were extracted, transformation names, transformation description, etc.).

The model viewer (or model UI) 406 receives the feature dataframe/feature information 414 from the feature generation system 404. In some embodiment, the model viewer 406 includes (or provides) a UI similar to that of the configuration UI. The model viewer 406 may, for example, automatically display a data summary including data quality, distribution, and univariate statistics for each feature. The model viewer 406 may also receive information for new features outputted by the feature engineering system and automatically display a feature summary table including the names of the involved transformations, descriptions and importance of the transformations, joins, and/or keys, as well as the joining paths from which original features were extracted.

Figure 5:
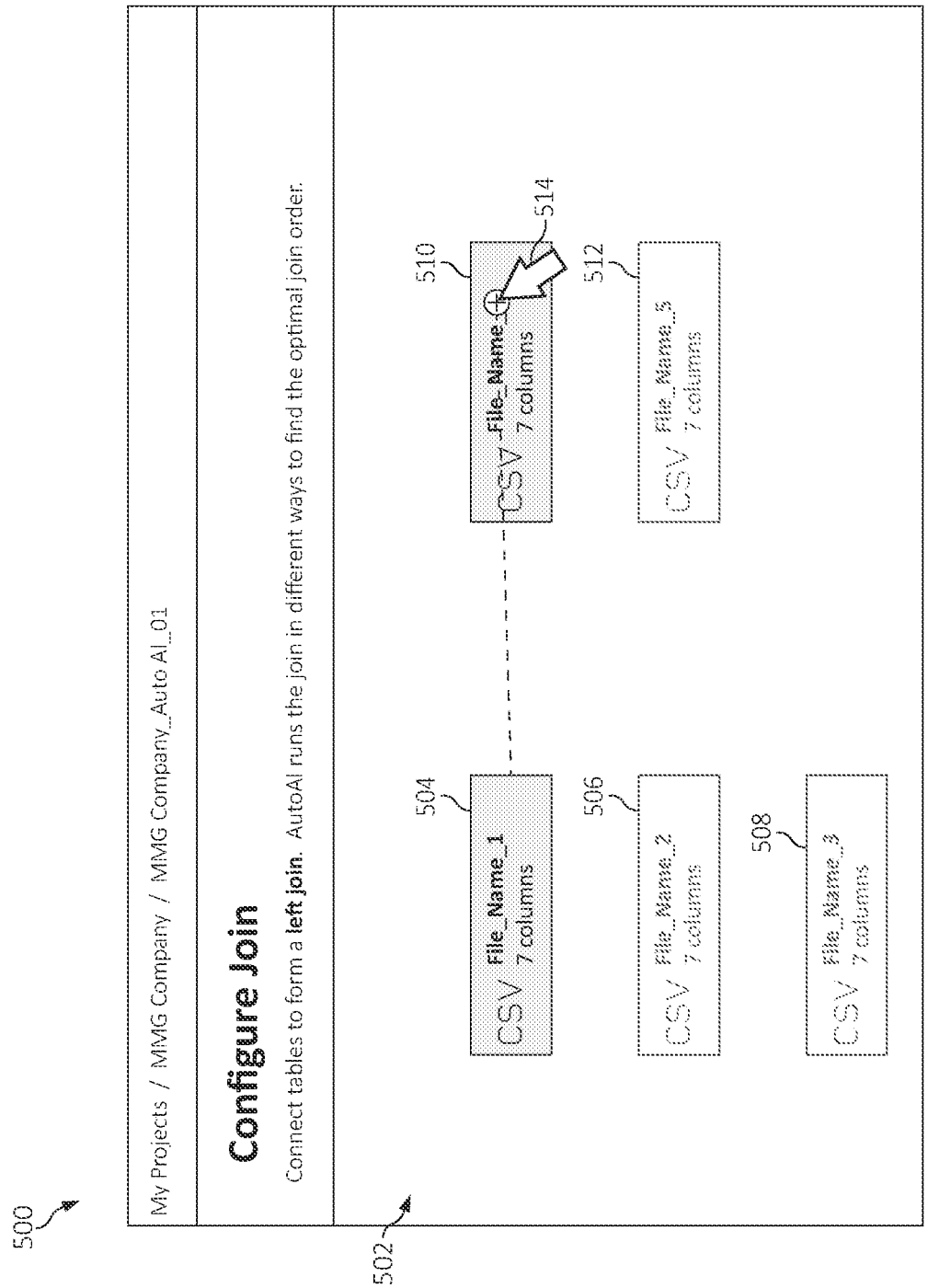
FIGS. 5-12 are plan views of a configuration user interface, illustrating various features thereof, according to an embodiment of the present invention.

FIG. 5 illustrates a configuration UI 500 according to an embodiment of the present invention. More particularly, FIG. 5 illustrates the configuration UI 500 at is may be rendered (or displayed) by a display device of a computing system as a user(s) is interacting with it (e.g., to upload/select tables, create joins between tables, select keys, etc.). As shown in FIG. 5, the configuration UI 500 includes or provides (perhaps among other components) a main workspace (or window) 502. Although not shown in detail, the user may upload or select multiple tables (e.g., from a database) into the system utilizing the configuration UI 500, as described above. In the example shown, five tables 504-512 have been uploaded into the system and are displayed in the main window 502. It should be noted that the tables 504-512 are represented by or displayed as relatively simple shapes (e.g., squares) or "nodes" (i.e., as opposed to displaying the various rows, columns, data values, etc. of the tables). It should also be noted that in the embodiment shown, information associated with the tables is displayed within the nodes. In the particular example shown, the information includes the file/table name (e.g., "File_Name_1"), the file type (e.g., "CSV"), and the number of columns (e.g., "7 columns").

Still referring to FIG. 5, the user may interact with the configuration UI 500 (and/or the tables 504-512) using any suitable user input device (e.g., a keyboard and/or mouse). In the example shown, a cursor 514 is provided, which may be controlled by the user via the user input device(s) (e.g., a mouse). For example, the user may control the cursor to "select" one of the tables (or nodes) 504-512 by, for example, "clicking" and/or "mousing over" the tables 504-512. Although not shown, additional information associated with the tables 504-512 may be displayed by the configuration UI 500 when the user selects one or more of the tables 504-512. Also, the user may set/select one of the tables 504-512 as the main/primary table (e.g., by selecting that table first, via a "right click" functionality, etc.) In the example shown, it may be assumed that table 504 has been set/selected as the primary table.

As described above, the user may utilize the configuration UI 500 to join tables (or create joins between tables). For example, in FIG. 5, this process is shown by the user moving the cursor 514 to "drag and drop" or "click and drag" a "line" (or connection line) between table 504 and table 510. However, in other embodiments, this process may be performed in various other ways (e.g., "clicking" on a first node and then "clicking" on a second node), as will be appreciated by one skilled in the art. Although the connection shown in FIG. 5 is being formed from the right side of table 504 and left side of table 510, it should be understood that connections may be formed through any of the sides of the tables (or node) 504-512 (e.g., top, bottom, left, right, etc.) and may take different shapes/forms (e.g., straight segments with angles between, curved lines, etc.). It should also be noted that in some embodiments each join formed may include more than one key.

Figure 6:
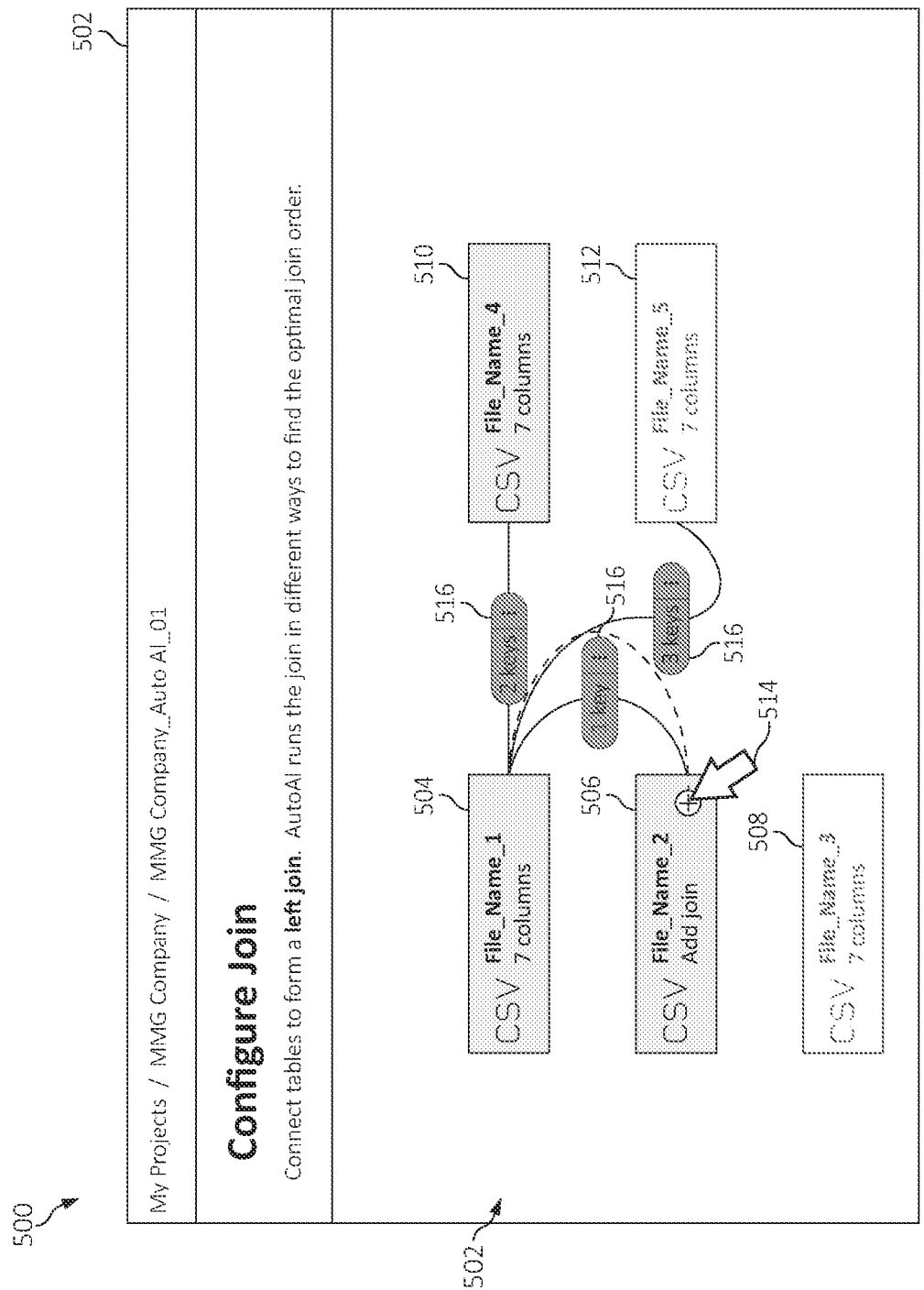

Also, joins may be formed between multiple tables (and/or more than one join may be formed between two particular tables), as shown in FIG. 6, which shows the configuration UI 500 of FIG. 5, with multiple joins 516 formed between the tables (i.e., tables 504, 506, 510, and 512). The process of forming multiples joins may be performed in a manner similar to that described above (e.g., utilizing the cursor 514). As shown in FIG. 6, in some embodiments, the number of keys included in (or associated with) each join 516 is displayed within a symbol (e.g., an oval or rounded rectangle) displayed to represent the join 516 (e.g., "3 keys").

Figure 7:
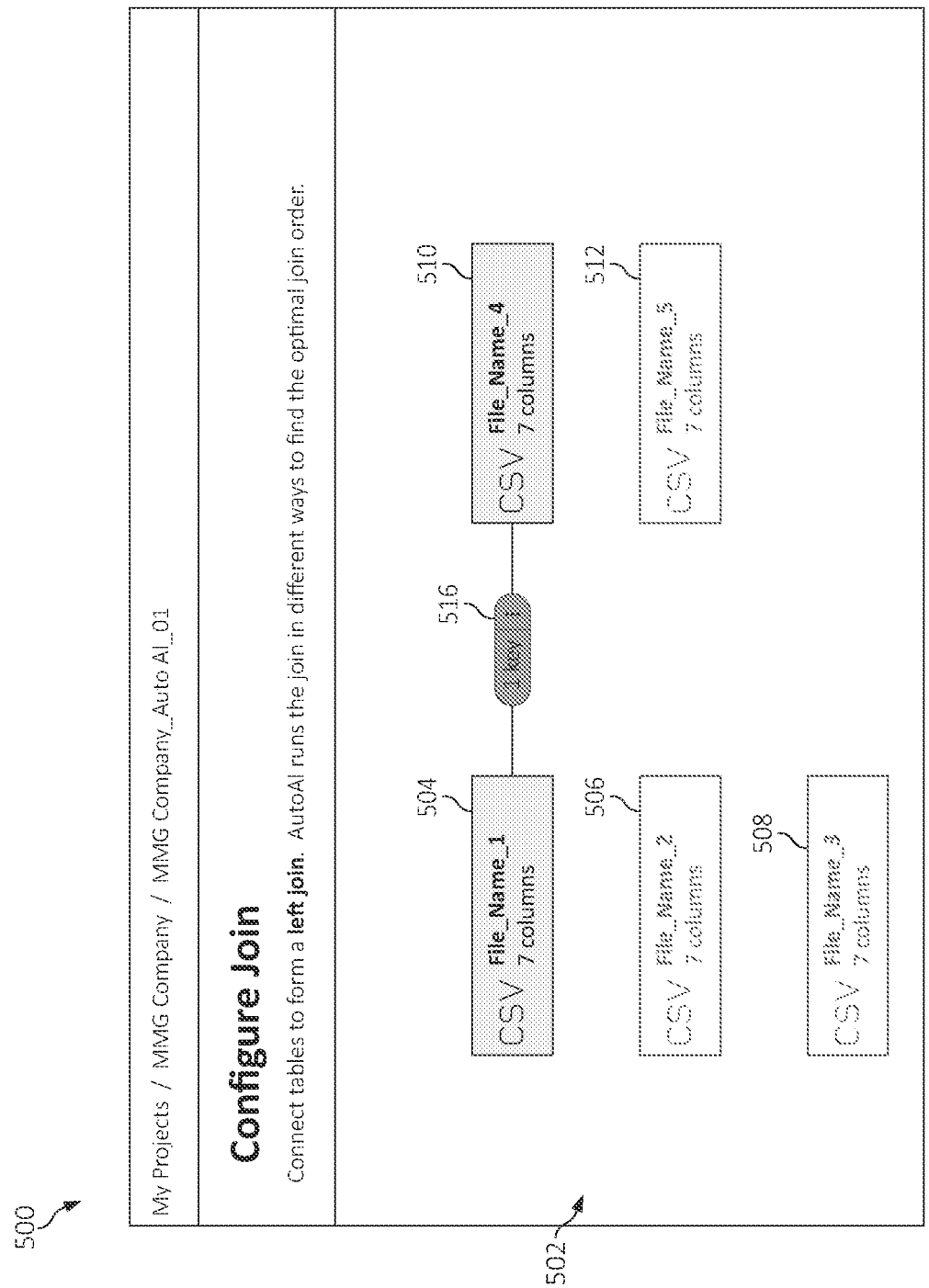
Figure 8:
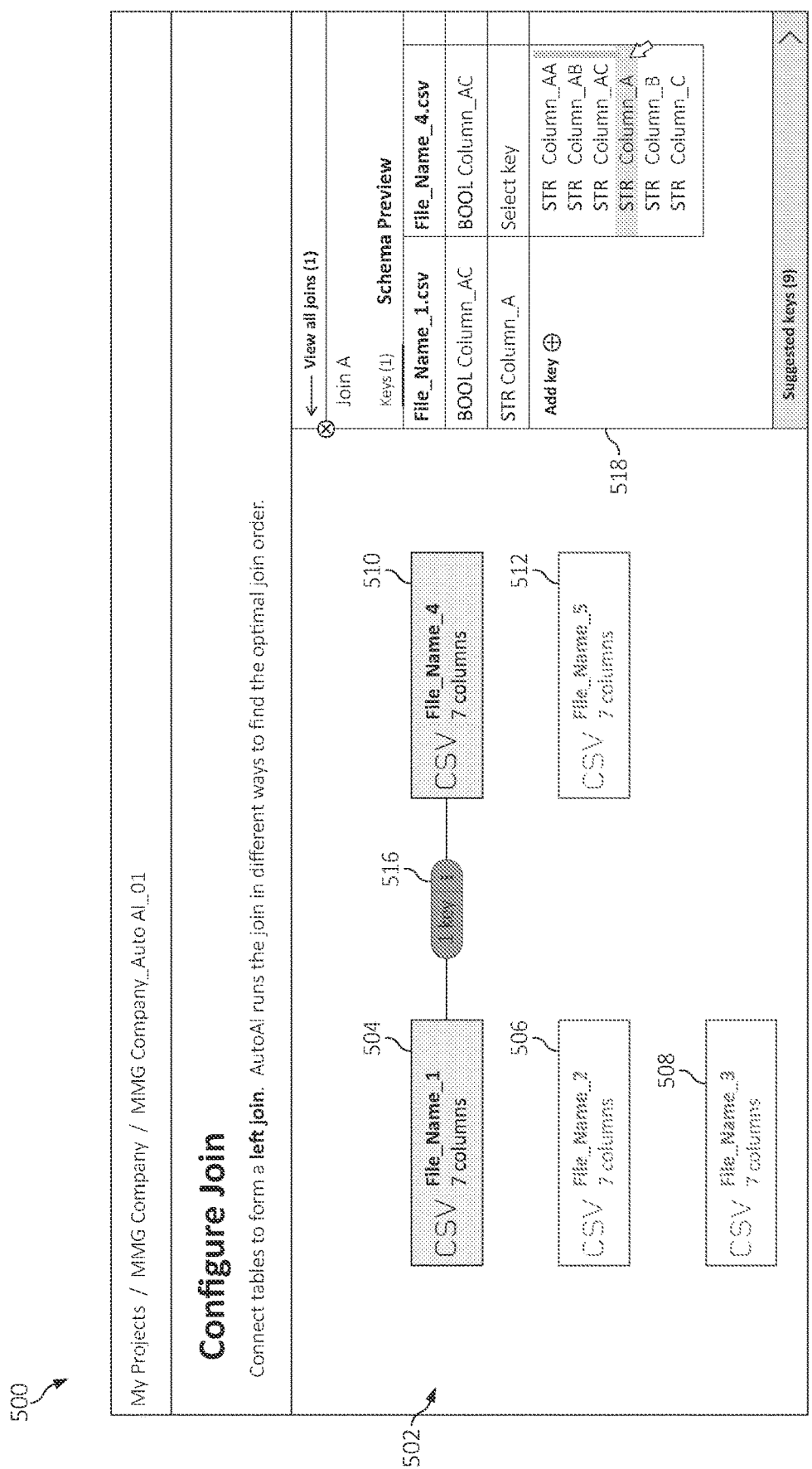

Referring now to FIG. 7, the configuration UI 500 is shown with a join 516 formed between table 504 and 510. In some embodiments, when a join is created and/or when a join is selected (e.g., "clicked on"), information associated with the join and/or keys associated with the join is displayed in the configuration UI 500. For example, as shown in FIG. 8, after the join 516 shown in FIG. 7 is created or selected, a details panel 518 may be displayed in the configuration UI 500 (e.g., on the right side of the configuration UI 500). The details panel 518 may list various types of information related to the join (and/or schema between the two tables), such as join name/identification, associated tables names, columns included in the tables, etc. Additionally, the details panel 518 may be utilized by the user to specify (or select or create) join keys (or keys) that are to be included in and/or utilized by the respective join. In some embodiments, a list of suggested and/or available keys may be provided (e.g., in a searchable dropdown or pull-down menu), from which the user can select the key(s) to be utilized. In such instances, the suggested keys may be automatically identified or inferred after analyzing the tables and/or names/types of columns within the tables (e.g., via a NLP technique, such as after the tables are uploaded or selected). Additionally, in some embodiments, the user may (also) manually add and/or create keys (e.g., by entering/ typing the appropriate information into text boxes (e.g., within the details panel 518).

Figure 9:
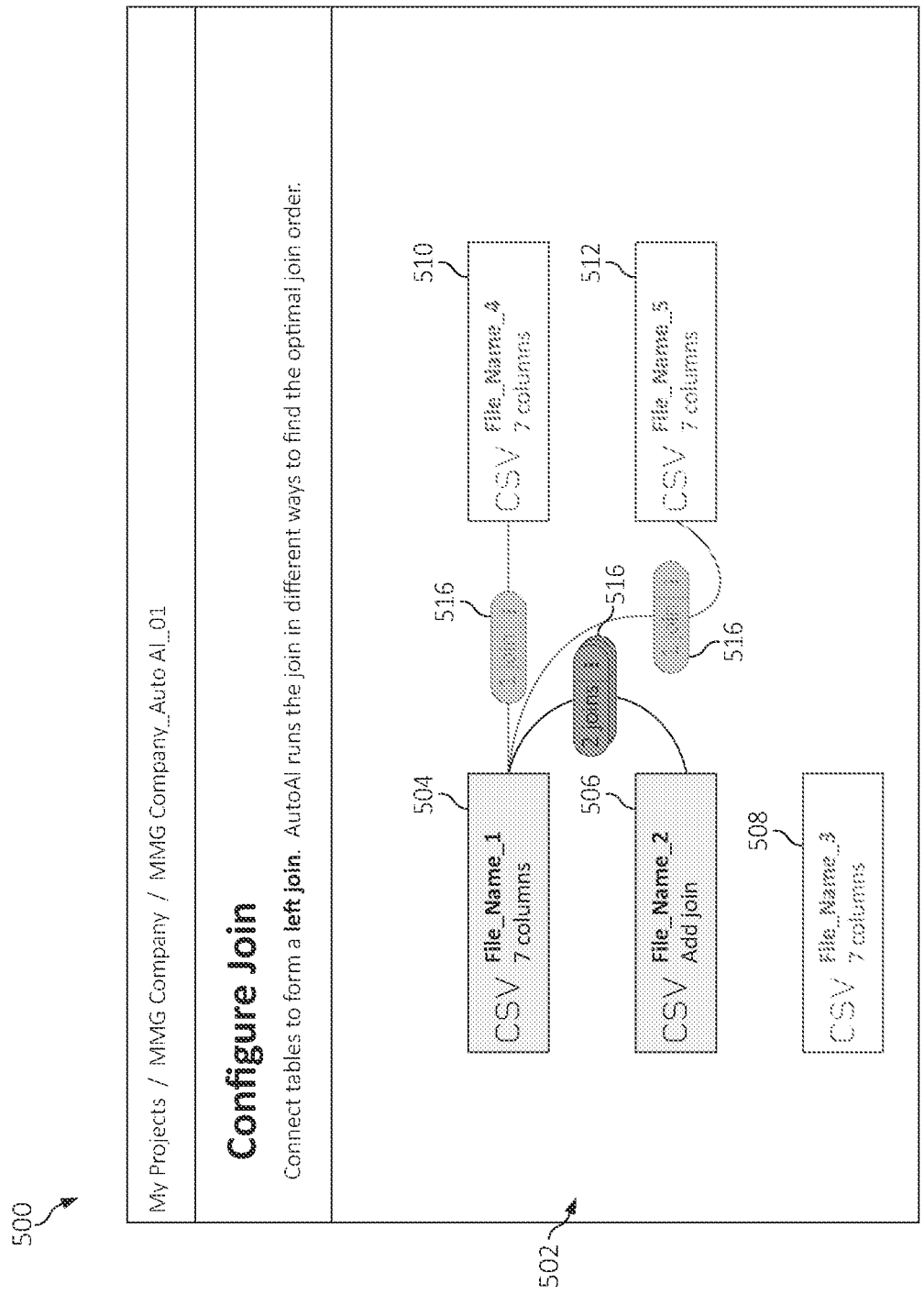

FIG. 9 illustrates the configuration UI 500 described above with multiple joins formed between the tables, in particular, tables 504, 506, 510, and 512. In particular, multiple joins (i.e., two joins) 516 have been created between table 504 and table 506, one join 516 has been created between table 504 and table 510, and one join has been created between table 504 and table 512. In the particular example shown, the joins 516 between table 504 and 506 are selected (and/or were created after the other joins). As such, although not shown in FIG. 9, information related to the joins 516 associated with tables 504 and 506 may be displayed in the configuration UI 500 (e.g., in a details panel similar to details panel 518), which may be utilized to select keys for the joins, as described above. It should also be noted that table 504 and table 506, along with the joins 516 created therebetween, are rendered in a manner different to tables 508, 510, and 512 (e.g., which are "greyed out" or "dimmed") because, for example, the joins 516 between tables 504 and 506 and/or tables 504 and 506 have been selected (e.g., the user has selected those joins to select keys for them).

Figure 10:
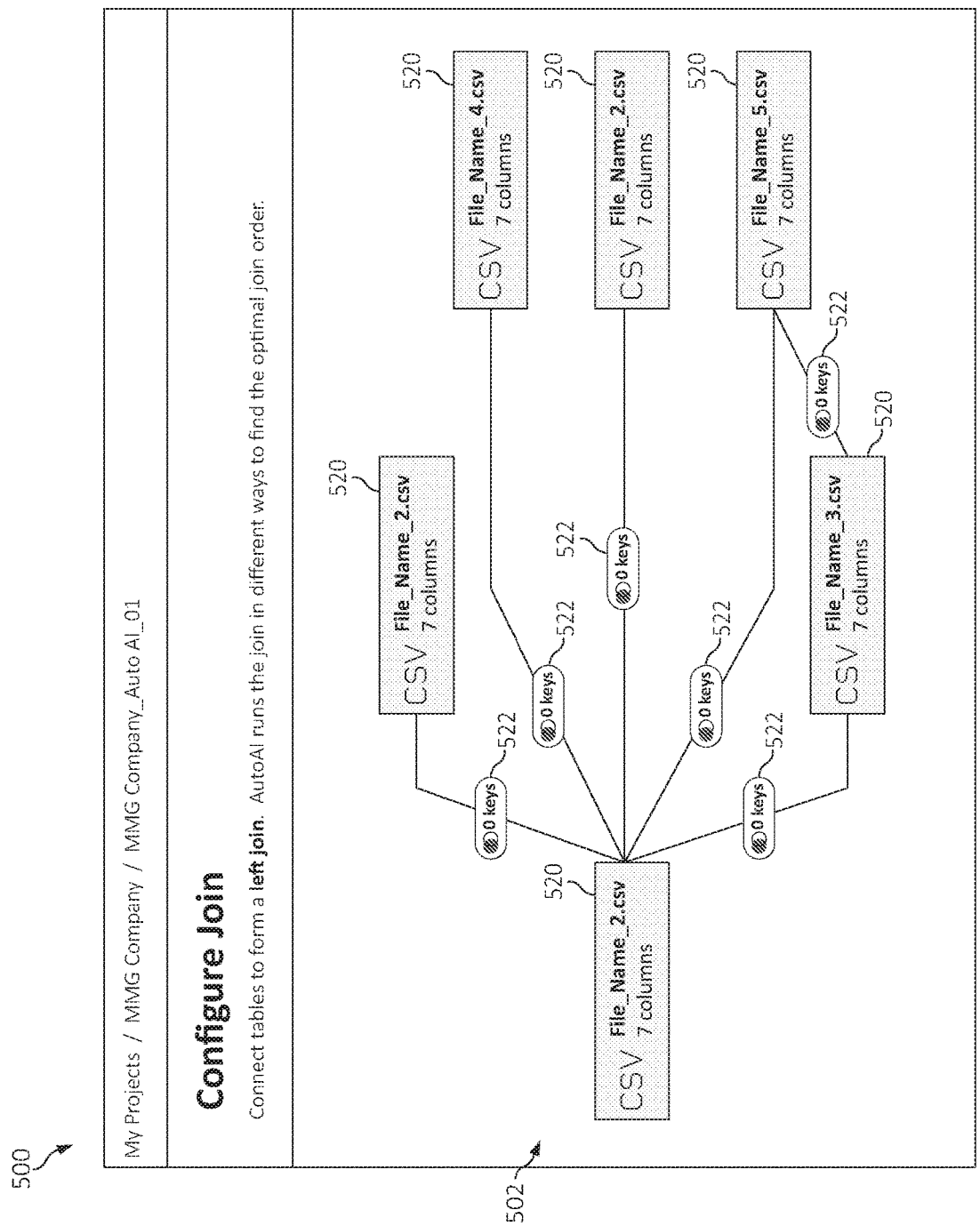

FIG. 10 shows the configuration UI 500 with multiple tables 520 and joins 522 (i.e., formed between the various tables 520) displayed therein. It should be noted that the tables 520 shown in FIG. 10 are arranged in three columns (as opposed to two columns, such as shown in FIGS. 5-9). Such an arrangement (or view) of the tables 520 may be created or controlled using a "zoom" or "zoom to fit" functionality provided by the configuration UI 500 (and/or the system as a whole). That is, a functionality may be provide to allow the user to adjust the view port (or "zoom") of the main window 502, allowing the user to conveniently scale the view port to show all tables.

Figure 11:
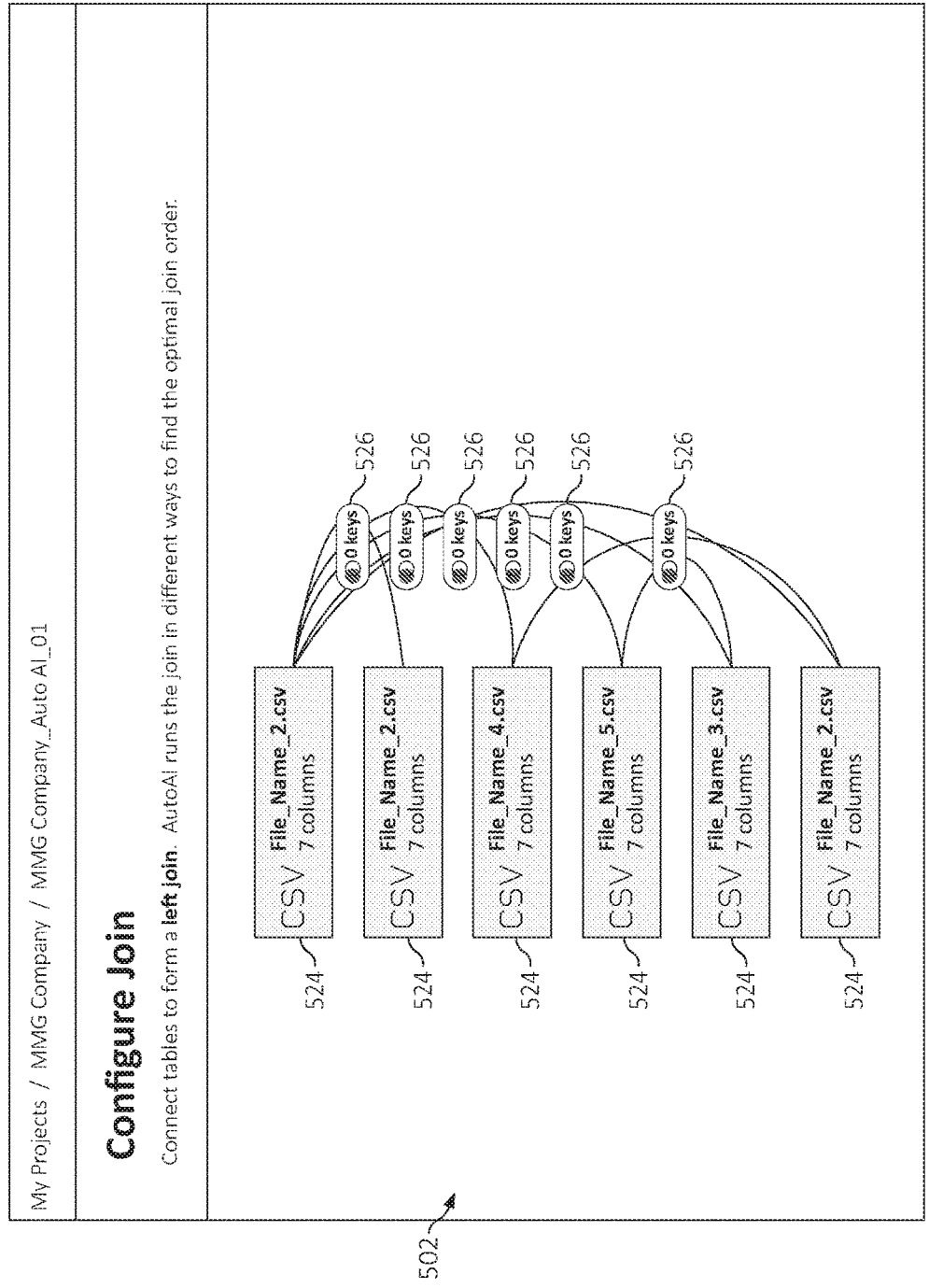
Figure 12:
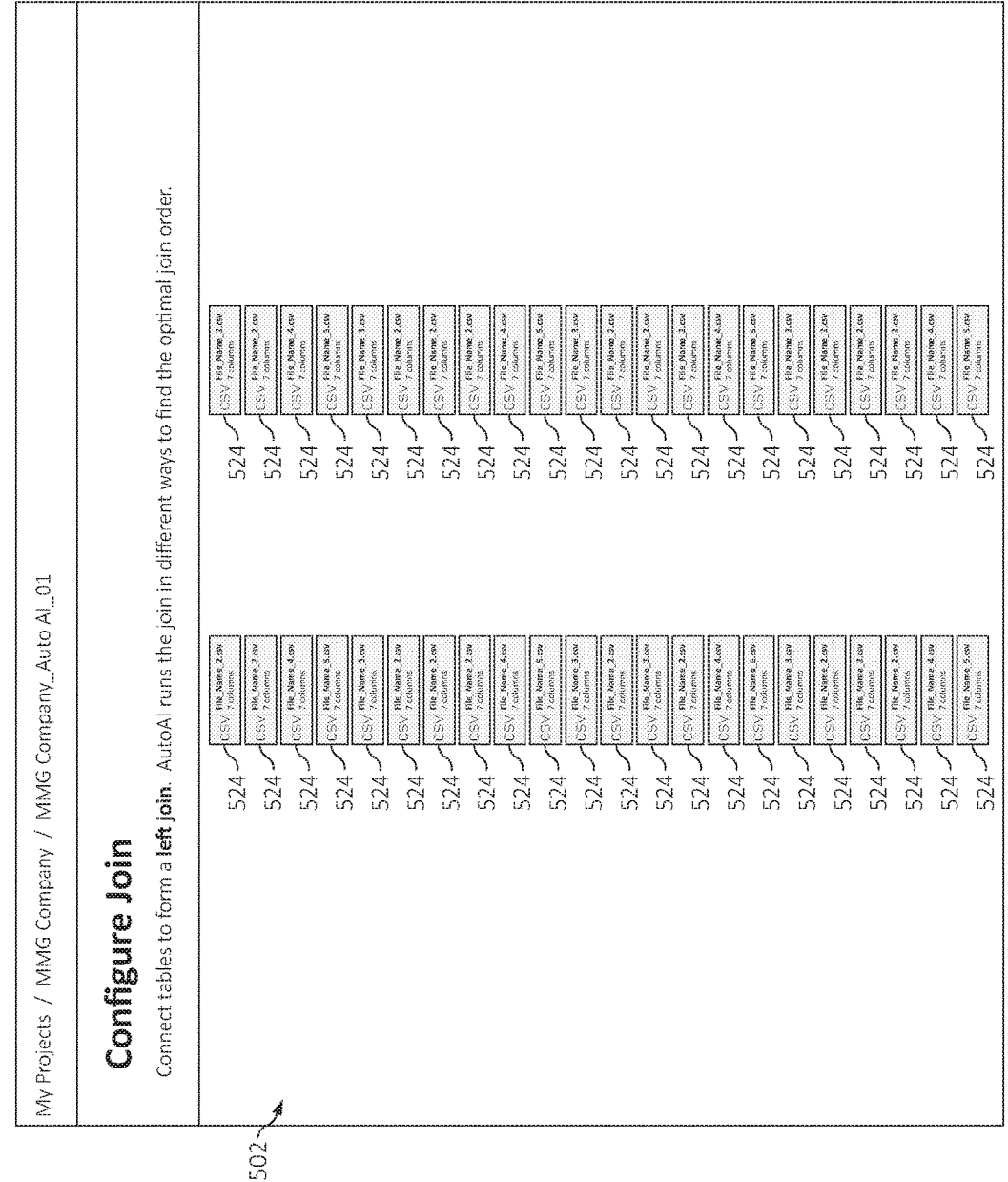

Referring now to FIG. 11, the configuration UI 500 is shown with another set and/or arrangement of tables 524, along with multiple joins 526, displayed therein. It should be noted that at least some of the tables 524 shown in FIG. 11 have multiple joins 526 associated therewith (e.g., the table 524 located at the top of the arrangement is associated with five joins 526). As such, when viewed as shown in FIG. 11, the arrangement may seem to be somewhat "cluttered" and/or confusing to the user. For such instances, the configuration UI may provide a "rearrange" functionality which may be activated by the user (e.g., within a pull-down menu, button appearing in the configuration UI 500, etc.). FIG. 12 illustrates the configuration UI 500 after such a functionality has been utilized. It should be noted that as shown in FIG. 12, the configuration UI 500 may display multiple instances or "copies" of at least some of the tables 524 to simplify the creation and/or displaying of the joins (which are not shown in FIG. 12 for sake of illustrative simplicity).

As described above, after the user utilizes the configuration UI 500 to input and/or select the appropriate information with respect to joins, keys, etc., a JSON file may be generated, which is provided to the feature engineering system. The feature engineering system may perform a sanity test on the input, provide recommendations with respect to the configuration, and automatically generate new features. The feature engineering system also generates (or outputs) a feature dataframe and feature information for new features (e.g., joining paths from which features were extracted, transformation names, transformation description, etc.).

The model viewer receives the feature dataframe/feature information from the feature generation system. In some embodiments, the model viewer includes (or provides) a UI similar to that of the configuration UI. The model viewer may, for example, automatically display a data summary including data quality, distribution, and univariate statistics for each feature. The model viewer may also receive information for new features outputted by the feature engineering system and automatically display a feature summary table including the names of the involved transformations, descriptions and importance of the transformations, joins, and/or keys, as well as the joining paths from which original features were extracted.

Figure 13:
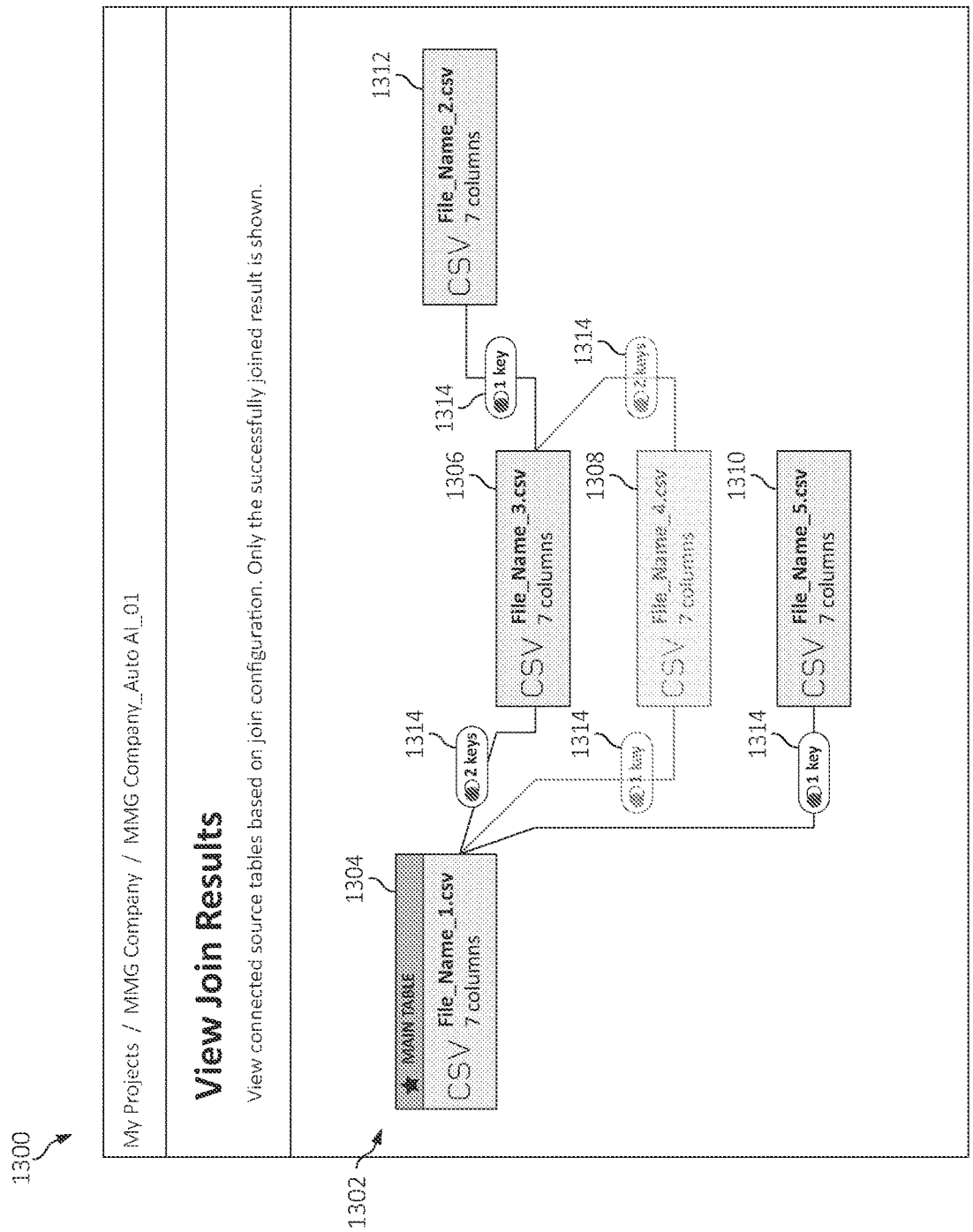
FIGS. 13-15 are plan views of a model viewer, illustrating various features thereof, according to an embodiment of the present invention.

Referring now to FIG. 13, an exemplary model viewer 1300 is shown. As described above, the model viewer 1300 may include and/or be in the form of a UI similar to that of the configuration UI 500 shown in FIGS. 5-12. More particularly, in some embodiments, the model viewer 1300 may be considered to be an alternative mode or functionality provided by the configuration UI. As such, similar to the configuration UI 500 described above, the model view 1300 includes a main window 1302. In the example shown, within the main window 1302, tables 1304-1312 are shown, along with various joins 1314 (i.e., which may be similar to the tables/joins displayed within the configuration UI). It should be understood that the tables 1304-1312 and the joins 1314 shown may be associated with a particular feature that was created by the feature generation system, based on input provided into the configuration UI. In other words, the tables 1304-1312 and the joins 1314 may have been utilized to generate a new feature. In the example shown, table 1304 is the main table.

Still referring to FIG. 13, the user may "navigate" through the tables 1304-1312 and joins 1314 in a manner similar to the configuration UI 500 described above. For example, the user may "click" joined tables to view the join results of those tables, as described in greater detail below. It should be noted that some of the tables 1304-1312 and joins 1314 may be rendered in a manner differently than the others (e.g., because some of the tables/joins are not selected and/or do not contribute any transformation to the main table).

Figure 14:
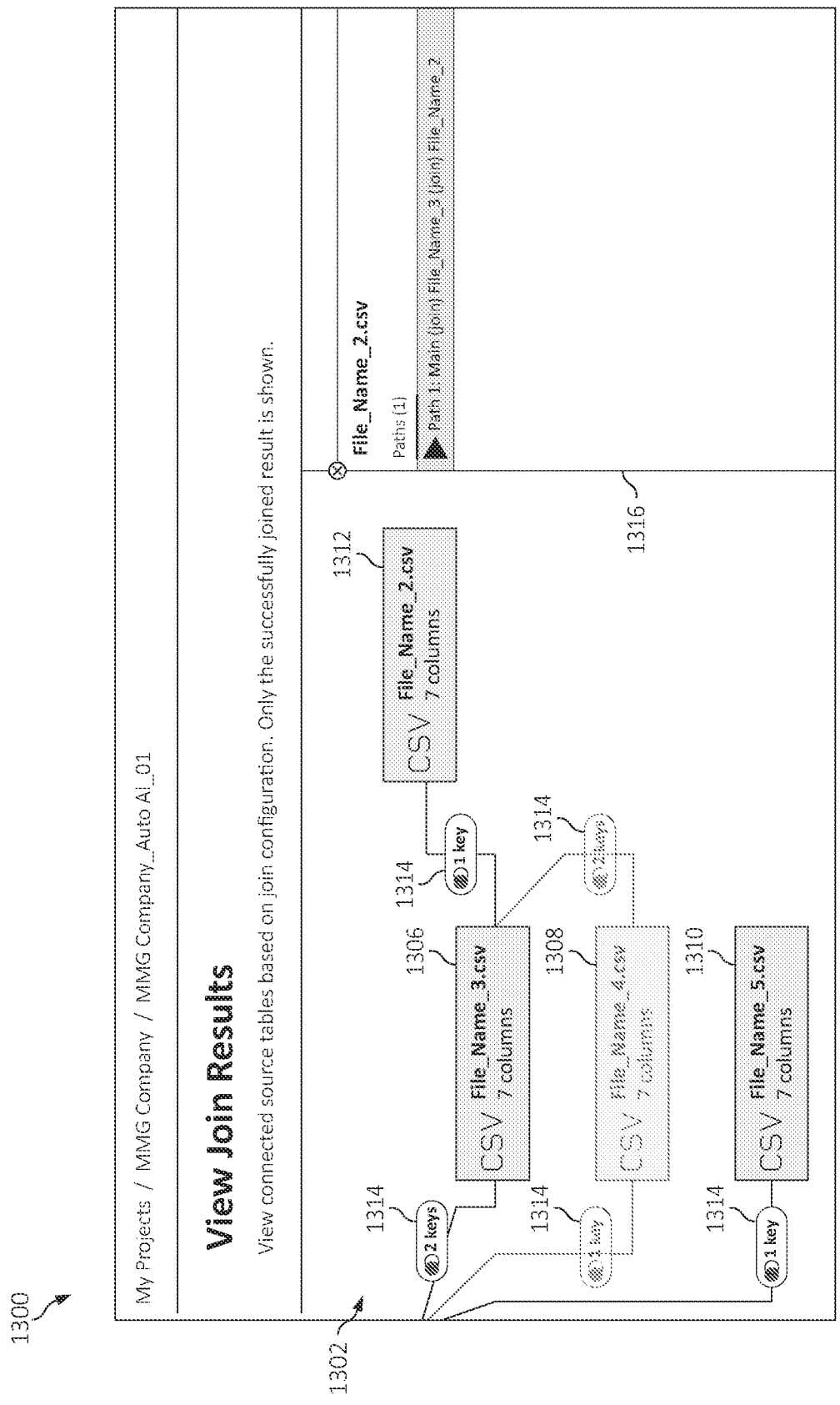

FIG. 14 illustrates the model viewer 1300 with the view and/or arrangement of the tables and joins changed. That is, only tables 1306-1312 are displayed. In the particular embodiment shown, table 1312 has been selected (or "clicked"). As a result, information related to table 1312, as well as the join 1314 between table 1312 and table 1306 (and/or table 1306), is displayed within the model viewer 1300. More particularly, as one example, information related to table 1312, such as join results, are displayed in a details panel 1316 (e.g., on the right side of the model viewer 1300), similar to the details panel of the configuration UI described above. In the particular example shown, within the details panel 1316, the name of table 1312 (e.g., "File_Name_2.csv") is shown, along with a (collapsed) listing of the join associated with table 1312 (e.g., "Path 1 . . . ").

Figure 15:
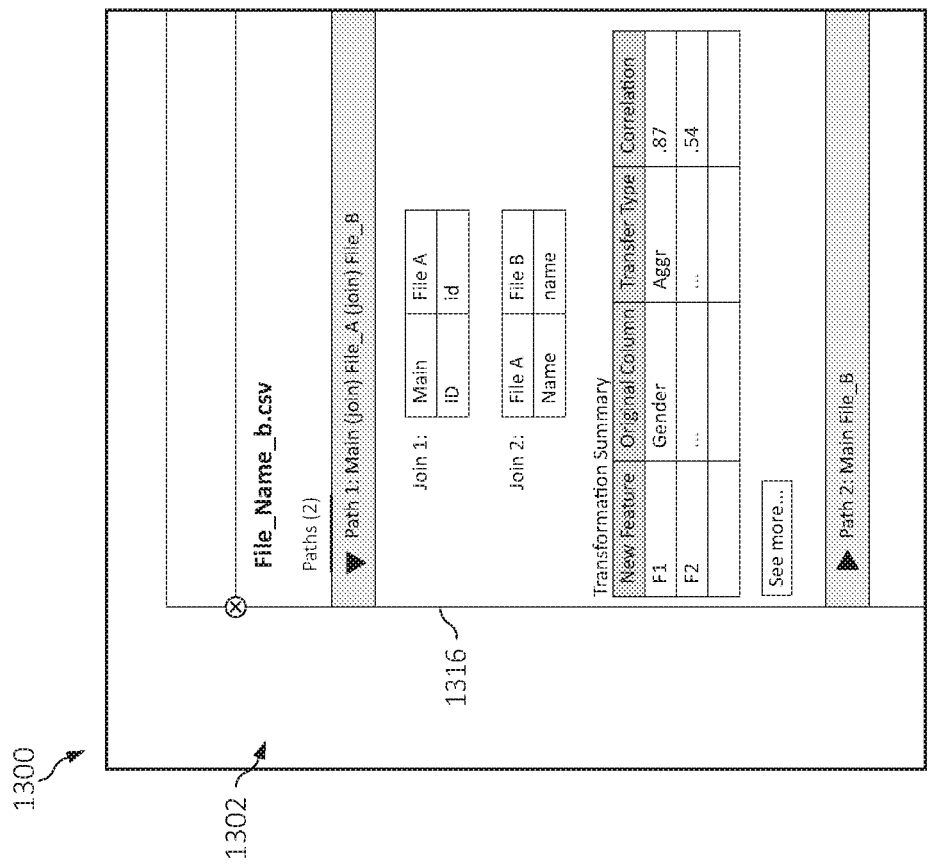

Referring now to FIG. 15, in some embodiments, at least a portion of the details panel 1316 may be expanded to show additional information related to the respective table and/or the associated join(s). For example, as shown in FIG. 15, the listing of the join shown has been expanded (e.g., by clicking/selecting "Path 1 . . . "), showing additional information. For example, the additional information shown may include keys for each join and transformation summaries to explain how the new features are/were transformed. Additionally, in the embodiment shown, a "see more" button is provided, which when actuated/selected/clicked may cause, for example, additional features to be displayed. In some embodiments, the top n number (e.g., five) of features are shown as a default setting (which may be reconfigured/changed), which may be sorted by, for example, feature correlation for a regression problem or information gain for a classification problem.

Figure 16:
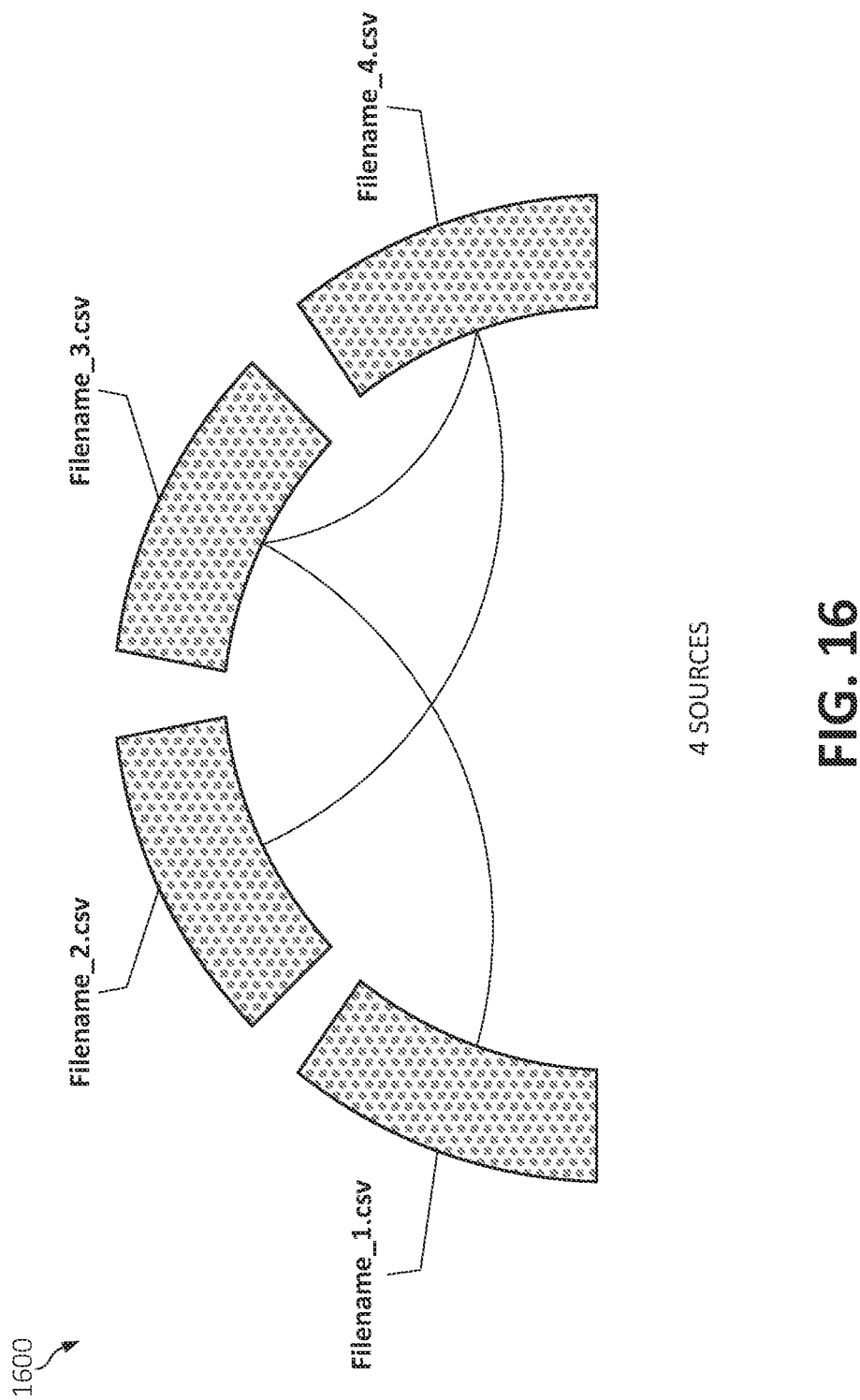
FIG. 16 is a diagram of joining details according to an embodiment of the present invention.

In some embodiments, joining details are displayed during the model training phase (e.g., performed utilizing newly generated features). The joining details may be displayed via a diagram, such as diagram 1600 shown in FIG. 16. The diagram 1600 may be utilized to show the sequence of joining tables which is utilized to generate the features.

As such, in some embodiments, methods for managing feature engineering with relational data, by a processor, are provided. For example, a first graphical user interface (GUI) including first visual representations of data tables may be provided. User input may be received utilizing the first GUI. The received user input may be indicative of a configuration to create at least one join between the data tables. A feature for a machine learning model may be caused to be generated based on the data tables and the received user input. A second GUI including second visual representations of the data tables may be provided. The second GUI may be configured to display information associated with the generated feature. The information associated with the generated feature may include a path and at least one key for the at least one join.

The information associated with the generated feature may further include a transformation summary including information associated with a transformation of the generated feature. The received user input may be indicative of a configuration to create a plurality of joins between the data tables. The second GUI may be configured to selectively display information associated with each of the plurality of joins in response to receiving additional user input utilizing the second GUI.

The received user input may be indicative of a selection of a first of the data tables and a second of the data tables within the first GUI. A list of recommended keys for the at least one join may be generated based on the selection of the first of the data tables and the second of the data tables. The list of recommended keys may be caused to be displayed utilizing the first GUI. The received user input may include a selection of at least one of the recommend keys.

The received user input may include movement of a cursor between the first of the data tables and the second of the data tables within the first GUI. A connection between the first of the data tables and the second of the data tables may be caused to be displayed within the first GUI. At least one recommendation associated with the configuration may be generated after the receiving of the user input. A notification of the at least one recommendation may be caused to be generated.

With the ever-increasing interest in data science, the methods and systems described herein may provide significant improvements compared to existing platforms. Current solutions generally focus on automating high-level tasks of data science strategies, such as hyperparameter optimization (HPO), machine learning optimization, and model selection. These high-level tasks may occupy less than a quarter of the overall efforts, while the low-level tasks such as data cleaning and feature engineering may account for the remainder. The methods and systems described herein facilitate the tedious task of feature engineering from relational data and is automated end-to-end. As described above, in some embodiments, interactive automated feature engineering configuration and visualization for relational data is provided, bringing automation to low-level data science.

Figure 17:
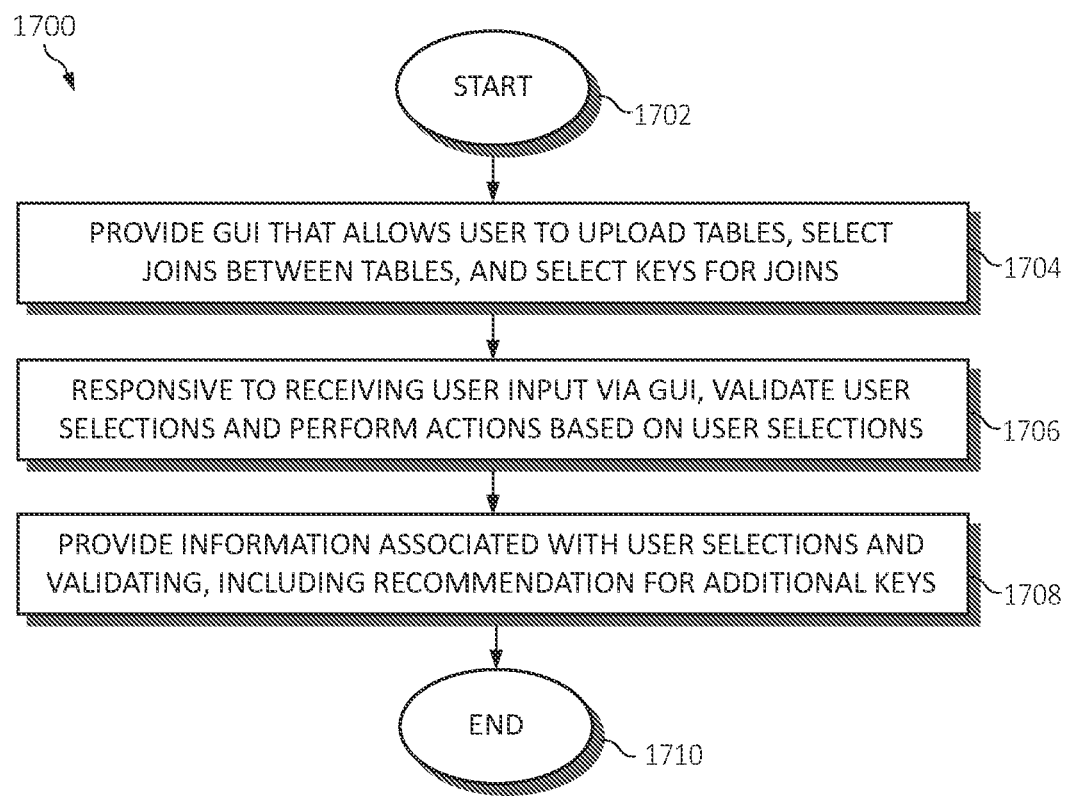
FIG. 17 is a flowchart diagram of an exemplary method for managing feature generation with relational data according to an embodiment of the present invention.

Turning to FIG. 17, a flowchart diagram of an exemplary method 1700 for managing relational data and/or feature engineering with relational data is provided. Method 1700 begins (step 1702) with, for example, a corpus (e.g., one or more documents, web pages, etc.) including multiple tables (or data tables) or references to tables being received and/or stored on a database.

A graphical user interface (GUI) that allows a user(s) (or provides a user with the ability) to upload (or select) a plurality of tables, select (or create) joins between the plurality of tables, and select keys for the joins is provided (step 1704). The GUI may be displayed or rendered by a display device of any suitable computing system and configured such that the user(s) may interact with it and/or visual representations of tables (e.g., nodes, symbols, etc.) using any suitable user input devices (e.g., a keyboard, mouse, etc.).

Responsive to receiving user input indicative of selecting joins between the plurality of tables and selecting keys for the joins utilizing (or through, via, etc.) the GUI, the user selections are automatically validated and actions associated with at least some of the plurality of tables are dynamically performed based on the user selections (step 1706). The actions may include forming a join between the at least some of the plurality of tables, linking a first key in the at least some of the plurality of tables with a second key in the at least some of the plurality of tables, and/or adjusting a presentation of the at least some of the plurality of tables. The adjusting of the presentation may automatically change a layout of at least some of the plurality of tables in the GUI. The validating of the user selections may include identifying problems (e.g., inconsistencies) associated with the user selections, identifying suggested changes to the user selections based on the identifying of the problems, and causing a notification of the suggested changes to be generated.

A feature for a machine learning model may be caused to be (automatically) generated based on the forming of the join between the at least some of the plurality of tables and the linking of the first key in the at least some of the plurality of tables with the second key in the at least some of the plurality of tables. The information may include a transformation summary including information associated with a transformation of the generated feature.

The received user input may be further indicative of a selection of a column in one of the plurality of tables as a prediction target column. The received user input may include movement of a cursor between a first of the plurality of tables (and/or a visual representation thereof, such as a node or symbol) and a second of the plurality of tables within the GUI. A connection between the first of the plurality of tables and the second of the plurality of tables may be caused to be displayed within the GUI.

Information associated with the user selections and the validating is provided (step 1708). The information may include a recommendation to link a third key in the at least some of the plurality of tables to a fourth key in the at least some of the plurality of tables (or more generally, recommendations for additional joins and/or keys). Additional user input may be received utilizing the GUI. The additional user input may be indicative of a selection to link the third key in the at least some of the plurality of tables to the fourth key in the at least some of the plurality of tables. The generating of the feature for the machine learning model may be further based on the selection to link the third key in the at least some of the plurality of tables to the fourth key in the at least some of the plurality of tables.

Method 1700 ends (step 1710) with, for example, the user utilizing the GUI to explore the information associated with the generated feature, as described above. The process may be repeated by the user selecting a second set of tables, causing a second feature to be generated in a similar manner. In some embodiments, feedback from users may be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing feature engineering with relational data, comprising:
providing, by a processor on a device, a graphical user interface (GUI) that provides a user with ability to upload a plurality of tables from a database, select joins between the plurality of tables, and select keys for the joins;
responsive to receiving user input indicative of selecting joins between the plurality of tables and selecting keys for the joins utilizing the GUI, automatically validating, by the processor, the user selections of joins and keys and dynamically performing actions associated with at least some of the plurality of tables based on the user selections,
wherein the actions include forming a join between the at least some of the plurality of tables to generate a feature of a learning machine model, linking a first key in the at least some of the plurality of tables with a second key in the at least some of the plurality of tables, and adjusting a presentation of the at least some of the plurality of tables, and wherein the adjusting of the presentation automatically changes a layout of at least some of the plurality of tables in the GUI; and
providing, by the processor based on the performing of actions, information associated with the user selections and the validating, wherein the information includes a transformation summary related to a transformation of the generated feature of the learning machine model and a recommendation to link a third key in the at least some of the plurality of tables to a fourth key in the at least some of the plurality of tables, wherein the validating of the user selections includes: identifying suggested changes to the user selections based on identifying of problems related the user selections; and
providing a notification of the suggested changes to a user, wherein the third key is different from the first key and the second key.

2. The method of claim 1, further comprising causing a feature for a machine learning model to be generated based on the forming of the join between the at least some of the plurality of tables and the linking of the first key in the at least some of the plurality of tables with the second key in the at least some of the plurality of tables.

3. The method of claim 2, wherein the information includes a transformation summary including information associated with a transformation of the generated feature.

4. The method of claim 2, further comprising receiving additional user input utilizing the GUI, wherein the additional user input is indicative of a selection to link the third key in the at least some of the plurality of tables to the fourth key in the at least some of the plurality of tables, and wherein the generating of the feature for the machine learning model is further based on the selection to link the third key in the at least some of the plurality of tables to the fourth key in the at least some of the plurality of tables.

5. The method of claim 1, wherein the received user input is further indicative of a selection of a column in one of the plurality of tables as a prediction target column.

6. The method of claim 1, wherein the received user input includes movement of a cursor between a first table of the plurality of tables and a second table of the plurality of tables within the GUI, and further comprising a causing a connection between the first table of the plurality of tables and the second table of the plurality of tables to be displayed within the GUI.

7. A system for managing feature engineering with relational data comprising:
a processor executing instructions stored in a memory device, wherein the processor:
provides on a user device a graphical user interface (GU) that provides a user with ability to upload a plurality of tables from a database, select joins between the plurality of tables, and select keys for the joins;
responsive to receiving user input indicative of selecting joins between the plurality of tables and selecting keys for the joins utilizing the GUI, automatically validates the user selections of joins and keys and dynamically performs actions associated with at least some of the plurality of tables based on the user selections,
wherein the actions include forming a join between the at least some of the plurality of tables to generate a feature of a learning machine model, linking a first key in the at least some of the plurality of tables with a second key in the at least some of the plurality of tables, and adjusting a presentation of the at least some of the plurality of tables, and wherein the adjusting of the presentation automatically changes a layout of at least some of the plurality of tables in the GUI; and
provides, based on the performing of actions, information associated with the user selections and the validating, wherein the information includes a transformation summary related to a transformation of the generated feature of the learning machine model and a recommendation to link a third key in the at least some of the plurality of tables to a fourth key in the at least some of the plurality of tables, wherein the validating of the user selections includes: identifying suggested changes to the user selections based on identifying of problems related the user selections; and
providing a notification of the suggested changes to a user, wherein the third key is different from the first key and the second key.

8. The system of claim 7, wherein the processor further causes a feature for a machine learning model to be generated based on the forming of the join between the at least some of the plurality of tables and the linking of the first key in the at least some of the plurality of tables with the second key in the at least some of the plurality of tables.

9. The system of claim 8, wherein the information includes a transformation summary including information associated with a transformation of the generated feature.

10. The system of claim 8, wherein the processor further receives additional user input utilizing the GUI, wherein the additional user input is indicative of a selection to link the third key in the at least some of the plurality of tables to the fourth key in the at least some of the plurality of tables, and wherein the generating of the feature for the machine learning model is further based on the selection to link the third key in the at least some of the plurality of tables to the fourth key in the at least some of the plurality of tables.

11. The system of claim 7, wherein the received user input is further indicative of a selection of a column in one of the plurality of tables as a prediction target column.

12. The system of claim 7, wherein the received user input includes movement of a cursor between a first table of the plurality of tables and a second table of the plurality of tables within the GUI, and wherein the processor further causes a connection between the first table of the plurality of tables and the second table of the plurality of tables to be displayed within the GUI.

13. A computer program product for managing feature engineering with relational data, by a processor, the computer program product embodied on a non-transitory computer-readable storage medium having computer-readable program code portions stored therein, the computer-readable program code portions comprising:

an executable portion that provides on a user device a graphical user interface (GUI) that provides a user with ability to upload a plurality of tables from a database, select joins between the plurality of tables, and select keys for the joins;

an executable portion that, responsive to receiving user input indicative of selecting joins between the plurality of tables and selecting keys for the joins utilizing the GUI, automatically validates the user selections of joins and keys and dynamically performs actions associated with at least some of the plurality of tables based on the user selections, wherein the actions include forming a join between the at least some of the plurality of tables to generate a feature of a learning machine model, linking a first key in the at least some of the plurality of tables with a second key in the at least some of the plurality of tables, and adjusting a presentation of the at least some of the plurality of tables, and wherein the adjusting of the presentation automatically changes a layout of at least some of the plurality of tables in the GUI; and an executable portion that provides, based on the performing of the actions, information associated with the user selections and the validating, wherein the information includes a transformation summary related to a transformation of the generated feature of the learning machine model and a recommendation to link a third key in the at least some of the plurality of tables to a fourth key in the at least some of the plurality of tables, wherein the validating of the user selections includes: identifying suggested changes to the user selections based on identifying of problems related the user selections; and providing a notification of the suggested changes to a user, wherein the third key is different from the first key and the second key.

14. The computer program product of claim 13, wherein the computer-readable program code portions further include an executable portion that causes a feature for a machine learning model to be generated based on the forming of the join between the at least some of the plurality of tables and the linking of the first key in the at least some of the plurality of tables with the second key in the at least some of the plurality of tables.

15. The computer program product of claim 14, wherein the information includes a transformation summary including information associated with a transformation of the generated feature.

16. The computer program product of claim 14, wherein the computer-readable program code portions further include an executable portion that receives additional user input utilizing the GUI, wherein the additional user input is indicative of a selection to link the third key in the at least some of the plurality of tables to the fourth key in the at least some of the plurality of tables, and wherein the generating of the feature for the machine learning model is further based on the selection to link the third key in the at least some of the plurality of tables to the fourth key in the at least some of the plurality of tables.

17. The computer program product of claim 13, wherein the received user input is further indicative of a selection of a column in one of the plurality of tables as a prediction target column.

18. The computer program product of claim 13, wherein the received user input includes movement of a cursor between a first table of the plurality of tables and a second table of the plurality of tables within the GUI, and wherein the computer-readable program code portions further include an executable portion that causes a connection between the first table of the plurality of tables and the second table of the plurality of tables to be displayed within the GUI.

* * * * *